United States Patent
Tauch et al.

(10) Patent No.: US 9,835,485 B2
(45) Date of Patent: Dec. 5, 2017

(54) METHOD FOR FUNCTIONAL TESTING OF ARRANGEMENT FOR DYNAMIC FUEL CONSUMPTION MEASUREMENT

(71) Applicant: AVL LIST GMBH, Graz (AT)

(72) Inventors: Michael Tauch, Graz (AT); Rudolf Christian, Graz (AT)

(73) Assignee: AVL List GmbH, Graz (AT)

( * ) Notice: Subject to any disclaimer, the term of this patent is extended or adjusted under 35 U.S.C. 154(b) by 249 days.

(21) Appl. No.: 14/613,564

(22) Filed: Feb. 4, 2015

(65) Prior Publication Data

US 2015/0219483 A1    Aug. 6, 2015

(30) Foreign Application Priority Data

Feb. 6, 2014    (AT) ................ A 50091/2014

(51) Int. Cl.
  *G01M 15/00*  (2006.01)
  *G01F 9/00*  (2006.01)
  *G01F 25/00*  (2006.01)
  *F02M 37/00*  (2006.01)
  *F02D 33/00*  (2006.01)

(52) U.S. Cl.
  CPC .......... *G01F 9/006* (2013.01); *F02D 33/003* (2013.01); *F02M 37/0047* (2013.01); *G01F 25/0007* (2013.01)

(58) Field of Classification Search
  USPC ............... 73/114.38, 114.41, 114.42, 114.48, 73/114.52, 114.53
  See application file for complete search history.

(56) References Cited

U.S. PATENT DOCUMENTS

| 6,874,480 B1* | 4/2005 | Ismailov ............ F02M 51/0678 123/494 |
| 7,055,366 B2 | 6/2006 | Lewis |
| 7,231,816 B2 | 6/2007 | Christian et al. |
| 2002/0108451 A1* | 8/2002 | May ......................... G01F 1/44 73/861.63 |
| 2004/0163459 A1* | 8/2004 | Christian ............ F02M 37/0029 73/199 |
| 2006/0277982 A1* | 12/2006 | Christian .............. F02D 33/003 73/114.52 |

(Continued)

FOREIGN PATENT DOCUMENTS

| DE | 102005012937 | 9/2006 |
| EP | 1091197 | 4/2001 |
| EP | 1019683 | 8/2008 |

(Continued)

OTHER PUBLICATIONS

English Abstract of EP 1091197.

(Continued)

*Primary Examiner* — Eric S McCall
(74) *Attorney, Agent, or Firm* — Dykema Gossett PLLC

(57) ABSTRACT

For the functional testing of an arrangement for dynamic fuel consumption measurement, at least two reference flows are produced through successive operation, at different frequencies, of a system pump (6) provided in any case for the regulated fuel flow, and the gradient determined from the reference measured values obtained is compared with the known gradients of the characteristic curve of the system pump (6).

4 Claims, 2 Drawing Sheets

(56) References Cited

U.S. PATENT DOCUMENTS

2010/0037615 A1* 2/2010 Williams ............. F16K 15/186
60/741
2010/0083770 A1 4/2010 Köck et al.

FOREIGN PATENT DOCUMENTS

| GB | 2295896 | 6/1996 |
|---|---|---|
| JP | 6224115 | 2/1987 |
| JP | 2001147150 | 5/2001 |
| WO | 2008095836 | 8/2008 |

OTHER PUBLICATIONS

English Abstract of JP 2001147150.
English Abstract of JPS 6224115.
English Abstract of DE 102005012937.

* cited by examiner

METHOD FOR FUNCTIONAL TESTING OF ARRANGEMENT FOR DYNAMIC FUEL CONSUMPTION MEASUREMENT

BACKGROUND OF THE INVENTION

Field of the Invention

The invention relates to a method for the functional testing of an arrangement for dynamic fuel consumption measurement, with reference measured values being recorded at certain reference flows at a flow sensor provided for the actual measurement of the dynamic fuel consumption in order to be compared with the expected measured values.

The Prior Art

Particularly for research and development pertaining to internal combustion engines, it is important to measure fuel consumption—which is the fuel mass per time unit actually introduced into the combustion chamber of the internal combustion engine—precisely and in real time. When on the test bench or in the respective application, the internal combustion engine is usually supplied with liquid fuel, such as gasoline or Diesel, from the tank from which the fuel is fed to a consumption sensor by gravity or with the aid of a fuel pump in order to measure the fuel inflow as well as to a conditioning unit in which, on the one hand, the required fuel over- or underpressure is set with the aid of a pump and optionally by means of pressure regulators and, on the other hand, above all a defined fuel temperature is set with a heat exchanger. Of course, the most essential component is the flow sensor provided for the actual measurement of the dynamic fuel consumption, for which reason its correct functioning must be checked at least from time to time. For this purpose, a reference flow is usually provided whose flow rate is known and/or controllable and can be compared with the actually measured value.

While the above-described preparation of a reference flow advantageously also enables the absolute calibration of the flow sensor, it requires comprehensive and correspondingly expensive provisions and additional method steps that are not suited to, or impede, quick functional testing of the overall arrangement.

It is therefore the object of the present invention to improve a method of the type mentioned at the outset such that quick functional testing of the arrangement, even during each startup, for example, can be performed for fuel consumption measurement without requiring comprehensive provisions and additional alterations and additions to the arrangement for the absolute calibration of the flow sensor that are only justified in larger time intervals.

SUMMARY OF THE INVENTION

This object is achieved according to the invention through the generation of at least two reference flows through successive operation, at different frequencies, of a system pump provided in any case for the regulated fuel flow in the arrangement, and through comparison of the gradient determined in this way from the different reference measured values with the known gradients of the characteristic curve of the system pump. As a result, absolutely no additional expenditure for equipment and no conversion in the arrangement is required in order to measure fuel consumption—the characteristic curve of the system pump and the gradient of the characteristic curve of the system pump defining the dependency of the flow on the frequency or speed of the pump are usually known from the manufacturer's data sheets or can easily be determined beforehand in an appropriate measurement series. Because the gradient of the characteristic curve of the system pump depends neither on the system pressure nor on the conveyed medium, the difference between the two reference measured values can be compared directly with the known gradients of the characteristic curve of the system pump without having to take any operating conditions (pressure, medium, etc.) into account for this simple functional testing of the flow sensor. During the determination of the reference measured values, the entire conveyed quantity of the system pump is expediently diverted over the flow sensor, whereas in normal operation (during the dynamic fuel consumption measurement), only the consumption of the test specimen flows over the flow sensor. This diversion can be performed either automatically or even manually, for example using a three- or two-way valve, which increases the additional effort only unsubstantially.

In another preferred embodiment of the method according to the invention, it is possible, via a pressure sensor provided in any case on the outlet side of the arrangement for checking and maintaining the system pressure, for several, preferably three, pressures to additionally be recorded at several, preferably three, pump frequencies/reference flows and compared to the pressure values to be expected for these pump frequencies/reference flows. It is therefore possible with the method according to the invention not only to test the function of the flow sensor, but also the function of the system pump. When functioning properly, the system pump delivers a defined pressure on the outlet side for a defined pump frequency and the associated reference flow. If the existing pressure sensor provided as described for the checking and maintenance of the system pressure is now used to measure the outlet pressure for several, for example three, different pump frequencies, the correct function of the pump can easily be inferred from the standard deviation of the three associated measured pressures.

In another preferred embodiment of the invention, a provision is made that several, preferably three, temperatures are measured via a temperature sensor arranged in the conditioning unit on the outlet side predominantly for temperature conditioning at several, preferably three, different pump frequencies/reference flows whose deviation from a mean value is used as information about the correct functioning of the conditioning unit. As described previously, the conditioning unit is responsible, among other things, for a constant temperature in the fuel, which is a requirement for valid measured results. The temperature stability for three different flow rates (pump frequencies) can be determined very easily in the described manner. For this purpose, the temperature is usually measured after a certain waiting time after setting of a certain pump frequency—the maximum deviation of the temperature from a mean value must then lie within a certain range; if this is the case for all three reference flows (pump frequencies), it can be assumed that the temperature conditioning is functioning correctly.

For the sake of simplicity, the pressure and temperature measurements for checking the pump function and the functioning of the temperature conditioning can be performed at the same pump frequencies/reference flows, but that is not absolutely necessary.

The invention is explained in further detail below with reference to the drawings.

Figure 1:
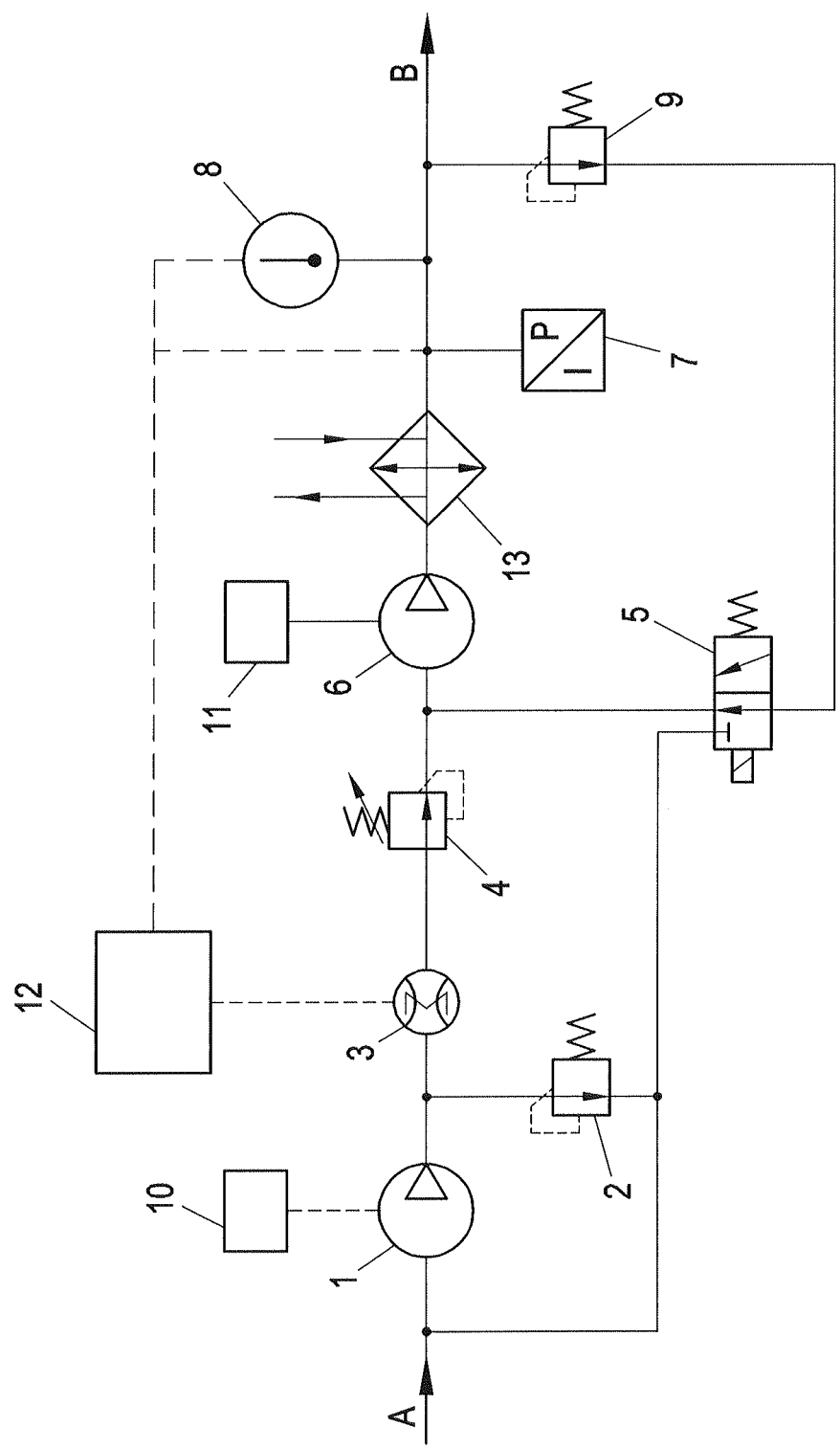
FIG. 1 shows a schematic representation of an exemplary arrangement for dynamic fuel consumption measurement.

Normal function of the arrangement according to FIG. 1:

Via the fuel intake A, fuel passes from the building services into the fuel measurement system and then via the connection B to an internal combustion engine (not shown here). The input circuit pump 1 rotates at the frequency that is set in the frequency converter 10, thus producing the primary pressure set at the pressure regulator 2 that is necessary for the functioning of the flow sensor 3. The pressure regulator 4 sets the so-called return pressure if the measurement system is being used on an internal combustion engine with return flow (not shown). The system pump 6 (measuring circuit pump here) rotates at the frequency set at the frequency converter 11, thus producing a pressure set at the bypass pressure regulator 9, which can be measured at the pressure sensor 7. A conditioning unit 13 is usually used in order to condition the fuel to a preset temperature. The outlet temperature can be measured at the temperature sensor 8.

In the instrument controller 12, the measured values are collected and further calculated during the function check. The purge valve 5 normally serves to establish a connection between input circuit and measurement circuit and to remove air bubbles from the system by means of a gas bubble separator (omitted from the figure for the sake of simplicity). During normal operation, the valve is switched as shown in the drawing.

Figure 2:
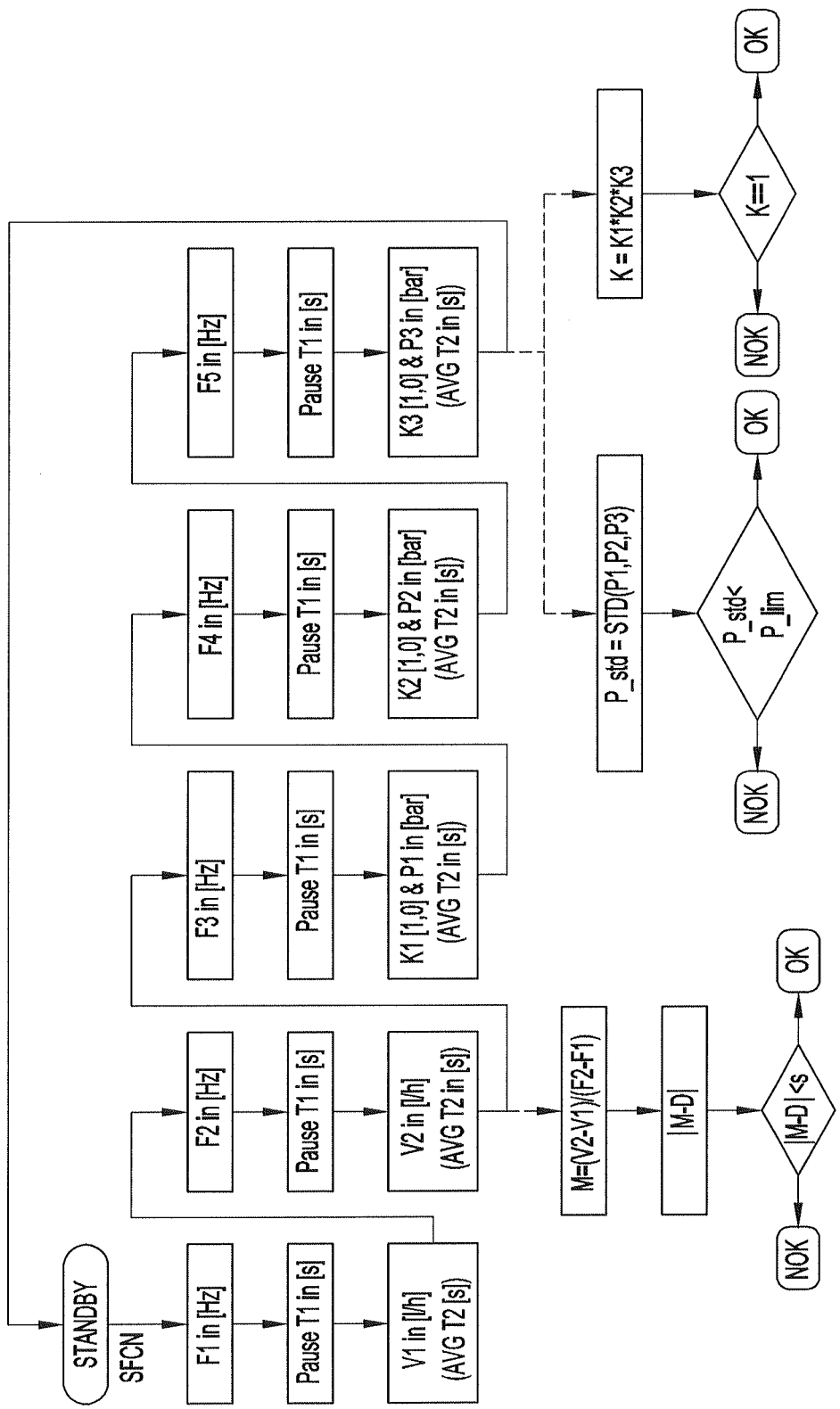
FIG. 2 shows a flow chart for the execution of the method according to the invention on the arrangement according to FIG. 1.

Function of the arrangement according to FIG. 1 during the function check with reference to FIG. 2:

In the STANDBY state (both pumps 1 and 6 are running), the flow sensor 3 is ready for measurement and the conditioning unit 13 is set at a certain temperature (measured at the temperature sensor 8). Through a command (SFCN in our case), the function test is started.

The measuring circuit pump (system pump 6) now runs up to the frequency F1 prescribed by the frequency converter 11. The purge valve 5 is then opened; that is, the circulating quantity conveyed by the system pump 6 now no longer runs in the circuit but is routed over the input circuit pump 1 and can thus be measured at the flow sensor 3. This is followed by a waiting time of T1 seconds in order to give the system time to stabilize. The flow VI is then measured at the flow sensor 3 in l/h and averaged over T2 seconds. The system pump 6 then runs up to the frequency F2 prescribed by the frequency converter 11. Another pause of T1 seconds. The second flow value V2 is measured with the flow sensor 3 in l/h and averaged over T2 seconds. The air bleed valve 5 is then closed again (normal operation).

The slope M is now calculated as indicated in FIG. 2 from the two flow values V1 and V2. This slope is compared with the reference value D of the system pump 6. If the amount of the difference is smaller than a definable threshold S, the sensor test is regarded as having been passed.

Then the system pump runs up to the frequency F3, pause for T1 . . . . The pressure P1 at the pressure sensor 7 is then measured for T2 seconds and averaged, and the temperature stability K1 is then determined at the end of the T2 seconds. There are various possibilities for determining the temperature stability. In our case, a sliding window is used within which the maximum deviation of the temperature from the mean value is calculated over the entire window. Standard values here would be: If the maximum temperature deviation within the last 10 seconds from the mean value of the last 10 seconds is less than 0.1° C., the temperature regulation is regarded as being stable or set. The check of the temperature stability is performed constantly by the instrument controller 12 on the basis of the outlet temperature at the temperature sensor 8.

This procedure is repeated another two times for K2 and P2 and for K3 and P3. The measurements are then evaluated at the instrument controller 12.

If all three temperature stability values K1, K2 and K3=1, then the temperature regulation is regarded as functioning properly. If the standard deviation of the averaged pressures P1, P2 and P3 is less than a parameterizable threshold value then the pressure regulation is regarded as functioning properly.

Instead of using the measuring circuit pump (6), it is of course also possible to use another pump that is provided in the system in any case, such as the input circuit pump 1 here, for example, for the functional testing according to the invention in the described manner, which merely requires different switching possibilities in the arrangement according to FIG. 1.

The invention claimed is:

1. A method for functional testing of an apparatus for measuring dynamic fuel consumption, said apparatus comprising a flow sensor for measuring dynamic fuel consumption in a line for delivering fuel to an engine, a pump in the line, and a recirculation line for diverting an entirety of fuel flow to said flow sensor, said pump having a known characteristic curve with gradients, said method comprising:
   (a) diverting an entirety of fuel flow over the flow sensor and obtaining first and second reference measured values at first and second reference flow rates determined by the pump operated at different frequencies,
   (b) determining a gradient from said first and second reference measured values, and
   (c) comparing the gradient determined in step (b) with a corresponding gradient from the know characteristic curve of the pump as a functional test of the flow sensor.

2. The method as set forth in claim 1, including a pressure sensor for measuring pressure in the line downstream of the pump, and measuring several pressures at several pump frequencies/reference flows for comparison to expected pump frequencies/reference flows.

3. The method as set forth in claim 2, including a conditioning unit in the line and a temperature sensor downstream of the conditioning unit, and measuring temperatures at several pump frequencies/reference flows for comparison to a mean valve to determine correct functioning of the conditioning unit.

4. The method as set forth in claim 3, wherein the pressure and temperature measurements are taken at the same pump frequencies/reference flows.

* * * * *